United States Patent
Schiltz et al.

(10) Patent No.: US 8,025,033 B2
(45) Date of Patent: Sep. 27, 2011

(54) HYDROGEN AND AMMONIA FUELED INTERNAL COMBUSTION ENGINE

(75) Inventors: Mike Schiltz, Algona, IA (US); Ted Hollinger, Algona, IA (US); Don Vanderbrook, Algona, IA (US)

(73) Assignee: Hydrogen Engine Center, Inc., Algona, IA (US)

( * ) Notice: Subject to any disclaimer, the term of this patent is extended or adjusted under 35 U.S.C. 154(b) by 0 days.

(21) Appl. No.: 12/129,431

(22) Filed: May 29, 2008

(65) Prior Publication Data
US 2008/0308056 A1    Dec. 18, 2008

Related U.S. Application Data

(60) Provisional application No. 60/932,109, filed on May 29, 2007.

(51) Int. Cl.
F02B 43/00    (2006.01)
(52) U.S. Cl. ............................. 123/1 A; 123/3
(58) Field of Classification Search ............ 123/1 A, 123/3
See application file for complete search history.

(56) References Cited

U.S. PATENT DOCUMENTS

| | | | | |
|---|---|---|---|---|
| 2,149,033 A * | 2/1939 | Schulze et al. | ........... | 44/455 |
| 3,455,282 A * | 7/1969 | Pearsall | ........... | 123/1 R |
| 3,834,359 A * | 9/1974 | Ando | ........... | 123/1 A |
| 4,476,817 A * | 10/1984 | Lindberg | ........... | 123/3 |
| 4,478,177 A * | 10/1984 | Valdespino | ........... | 123/3 |
| 5,419,286 A * | 5/1995 | Edison et al. | ........... | 123/1 A |
| 5,862,793 A * | 1/1999 | Jay et al. | ........... | 123/467 |
| 7,225,787 B2 * | 6/2007 | Bromberg et al. | ........... | 123/198 A |
| 2008/0060612 A1 * | 3/2008 | Cohn et al. | ........... | 123/350 |

FOREIGN PATENT DOCUMENTS

| JP | 55104513 A | * | 8/1980 |
| JP | 05332152 A | * | 12/1993 |
| JP | 07331265 A | * | 12/1995 |

* cited by examiner

*Primary Examiner* — Noah Kamen
(74) *Attorney, Agent, or Firm* — Kent A. Herink; Emily E. Harris

(57) ABSTRACT

Disclosed is a method of operating an internal combustion engine simultaneously with ammonia and another fuel. The other fuel may be hydrogen, ethanol, propane, natural gas, liquefied petroleum gas, or the like. In a preferred embodiment, the other fuel is hydrogen and the engine has zero carbon emissions. A control system is programmable to adjust the proportion of ammonia and the other, catalyst fuel as selected by the operator.

7 Claims, 1 Drawing Sheet

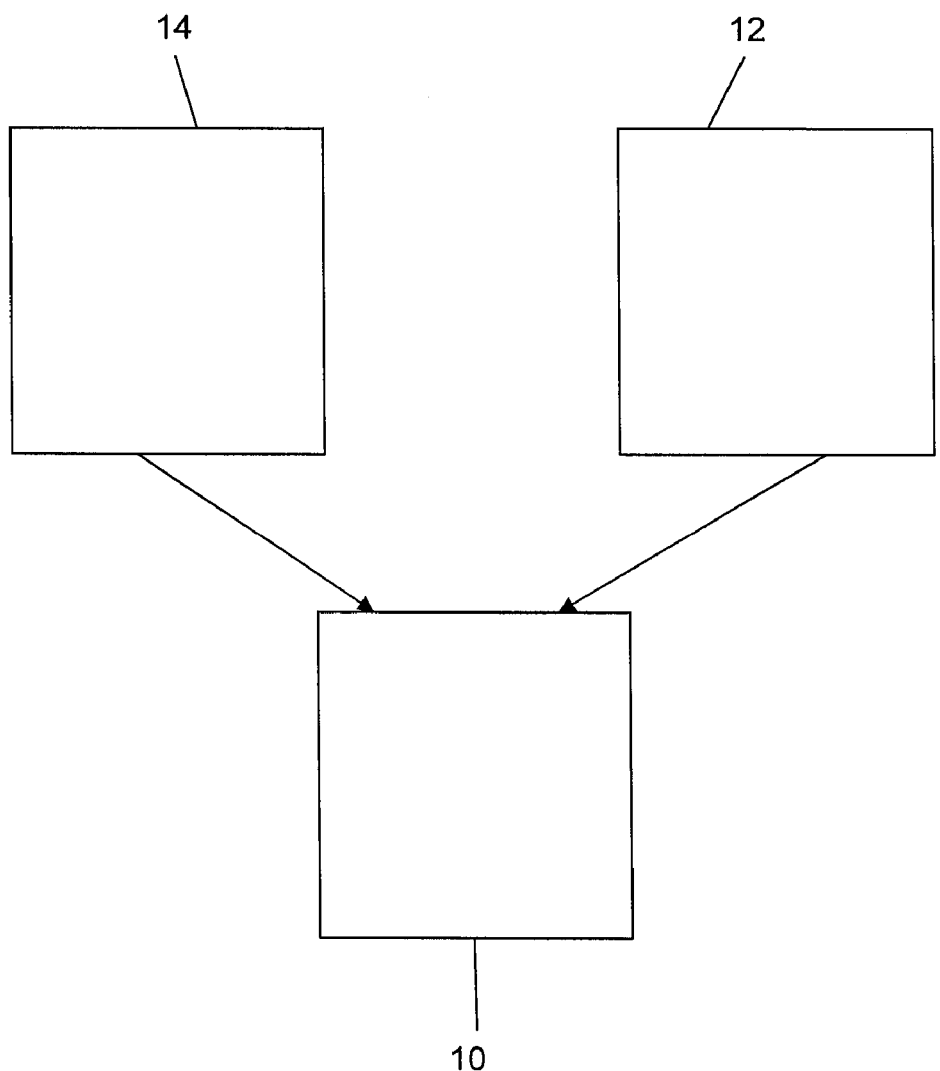
The Figure

HYDROGEN AND AMMONIA FUELED INTERNAL COMBUSTION ENGINE

This application claims priority to U.S. Patent Application Ser. No. 60/932,109 filed May 29, 2007.

BACKGROUND OF THE INVENTION

The present invention relates generally to internal combustion engines and, more specifically, to internal combustion engines fueled with a catalyst fuel, such as hydrogen ($H_2$), and ammonia ($NH_3$) in any proportion to eliminate $CO_2$ emissions.

Internal combustion engines have been run on hydrogen with electronic fuel injection. BMW and Ford Motor Company have demonstrated the technology in the automotive sector. Hydrogen Engine Company has shown the technology in the industrial sector. Ammonia was tested as a fuel by Rudolf Diesel, before he invented the diesel engine, and others with limited success. The use of electronic fuel injection for ammonia has not previously been demonstrated. Ammonia has a very slow flame velocity and a high ignition temperature making it hard to use as a fuel. Hydrogen has a high flame velocity and a low ignition temperature making it easy to ignite. Hydrogen is known to burn 8.3 times faster than gasoline. Specialized engine controls are required to run an internal combustion engine on either type of fuel and even more specialized to run both. Ammonia has a high hydrogen content (~17%), is easily stored and widely distributed.

The world needs to reduce greenhouse gas emissions and dependence on fossil fuels. Hydrogen can meet both requirements, however hydrogen is not yet widely distributed and is very difficult to store. It is the difficulty and expense of storing hydrogen that is expected to limit its use. Ammonia is widely distributed as anhydrous ammonia (a fertilizer). It is also easily stored in vessels identical to propane tanks except with a different valve system. Ammonia is a more ideal fuel because it is not considered flammable, is widely distributed, and is easily stored. A technique for use of ammonia as a fuel in internal combustion engines is needed.

SUMMARY OF THE INVENTION

The present invention consists of methods of operating internal combustion engines on a catalyst fuel such as hydrogen and ammonia in any proportion. Dual fuel systems are utilized, one for the catalyst fuel and one for ammonia. The dual fuel systems are controlled by an electronic control system to adjust as desired the proportion of hydrogen and ammonia being used to fuel the engine. In a preferred mode of operation, the engine is started using a mixture rich in the catalyst fuel and then the proportion of ammonia is adjusted for preferred operation.

An object of the present invention is to design and manufacture an internal combustion engine that can achieve near zero emissions and run primarily on ammonia.

The FIGURE is a schematic diagram of a hydrogen supply tank, an ammonia supply tank, and an internal combustion engine of the present invention.

DETAILED DESCRIPTION OF PREFERRED EMBODIMENTS

A spark ignited internal combustion engine 10 has been developed with a dual fuel system, including hydrogen supply tank 12 and an ammonia supply tank 14 (see the FIGURE) and a special engine control system including special software. The engine control system starts the engine on either hydrogen or on a combination of hydrogen and ammonia where in the latter case the percentage of hydrogen is adjusted to ensure proper starting. Once the engine is running the engine control system adjusts the percentage of hydrogen needed for proper operation. The percentage of hydrogen can be from about 5% to 100%, while the percentage of ammonia can be from 0% to about 95%. Ammonia provides greater power and requires less storage space and is therefore the preferred fuel. The preferred way to operate the engine is to start with a hydrogen rich mixture and slowly decrease the percentage of hydrogen until the minimum amount required for proper engine operation is achieved. This minimum will be determined by several factors. The most notable is the flame velocity. At higher engine speeds (rpms) greater amounts of hydrogen will be required.

The hydrogen and ammonia base fuel engine has the capability of controlling the supply of the air-fuel mixture via a dual injector and fuel rail system, whereby the primary fuel, ammonia, is injected in conjunction with a catalyst fuel. While the preferred catalyst fuel is hydrogen, other catalyst fuels within the scope of the invention include liquefied petroleum gas (LPG or LP), methane, ethanol or gasoline. The system can be employed in either stationary applications, or mobile applications.

The ammonia base fuel engine utilizes an intake manifold system where the electronic fuel injectors are arranged for optimum dispersal of both the base (ammonia) fuel, as well as the catalyst fuel. These injectors are preferably manifolded to a common fuel rail specific to each fuel. However, it is also within the scope of the invention to provide an individual fuel supply for each injector, particularly if cost/benefit warrants. An advantage of the present system is the uniformity between fuel rails, which further ads to serviceability of the system.

The injectors can be run in sequence, or each fuel rail can be timed independently for full optimization. Application flexibility is further enhanced by the injection systems ability to be operated by other engine control modules offered for sale by other original equipment manufacturers which make a dual injector manifold.

The ammonia fuel management system is capable of being employed as a system on a wide variety of engines, making it a universal and tunable system for use on nearly any spark ignited internal combustion engine.

The ammonia fueled engine can be carried to a more basic design, whereby venturis, also known as carburetors or mixers in the art, are utilized to distribute the air fuel mixture into the intake manifold. This system can utilize a single or dual mixers, whereby ammonia is either co-mingled in liquid form with the catalyst fuel, including but not limited to, gasoline or ethanol, or is introduced under vacuum in a gaseous state with the gaseous catalyst fuel, including but not limited to, hydrogen, natural gas, LPG, or other appropriate catalyst gaseous charge.

A 4.9 L in-line 6 cylinder engine has been modified by adding a second fuel injector to each cylinder and modifying the wiring harness and controller to accommodate the second fuel injector. The software used in this application starts the engine on 100% hydrogen and then adds ammonia as the engine comes up to operating temperature. The engine is run lean (EQR=0.4) to eliminate $NO_x$ formation. Once the engine is up to temperature the $NH_3/H_2$ ratio is maximized. In the adjustment of the $NH_3/H_2$ ration the amount of $H_2$ is reduced to the lowest flow rate possible. In doing this the need to store hydrogen is minimized. Ammonia contains more energy per volume than hydrogen therefore higher power levels are possible as the $NH_3/H_2$ ratio is raised. Table 1 shows the values of a number of parameters during operation of the engine.

TABLE 1

| Time | RPM | Injection time | Oxygen (A/F) | Injection time | Oxygen (phi) | MAP (bar) | Fuel Pressure (psig) | TPS |
|---|---|---|---|---|---|---|---|---|
| 8:03:47 | 58593 | 0.00 ms | 0.0 | 0% | INF | 0.939 | 67.8 | 6.00% |
| 8:03:47 | 58593 | 0.00 ms | 0.0 | 0% | INF | 0.903 | 67.8 | 6.00% |
| 8:03:47 | 58593 | 0.00 ms | 0.0 | 0% | INF | 0.878 | 67.8 | 6.60% |
| 8:03:48 | 0 | 1.41 ms | 0.0 | 0% | INF | 0.916 | 67.8 | 6.70% |
| 8:03:48 | 0 | 1.39 ms | 0.0 | 0% | INF | 0.852 | 67.8 | 6.80% |
| 8:03:48 | 182 | 1.01 ms | 67.3 | 0% | 0.22 | 0.566 | 67.8 | 9.40% |
| 8:03:49 | 726 | 1.01 ms | 28.9 | 1% | 0.51 | 0.374 | 68.0 | 7.50% |
| 8:03:49 | 874 | 2.13 ms | 26.6 | 2% | 0.55 | 0.309 | 67.6 | 6.10% |
| 8:03:49 | 865 | 1.94 ms | 26.9 | 1% | 0.55 | 0.306 | 67.6 | 6.10% |
| 8:03:50 | 811 | 1.04 ms | 24.7 | 1% | 0.60 | 0.322 | 67.8 | 6.20% |
| 8:03:50 | 775 | 0.83 ms | 23.9 | 1% | 0.61 | 0.347 | 67.8 | 6.60% |
| 8:03:50 | 755 | 0.88 ms | 23.9 | 1% | 0.62 | 0.355 | 67.8 | 6.50% |
| 8:03:51 | 747 | 0.86 ms | 23.7 | 1% | 0.62 | 0.356 | 68.0 | 6.50% |
| 8:04:50 | 952 | 3.39 ms | 16.1 | 3% | 0.92 | 0.303 | 65.6 | 6.20% |
| 8:05:50 | 1322 | 6.16 ms | 19.0 | 7% | 0.77 | 0.367 | 63.8 | 13.70% |
| 8:06:50 | 1821 | 11.57 ms | 23.2 | 18% | 0.63 | 0.577 | 58.1 | 26.50% |
| 8:07:50 | 1802 | 11.79 ms | 23.5 | 18% | 0.63 | 0.589 | 57.0 | 26.60% |
| 8:08:50 | 1793 | 11.81 ms | 24.0 | 18% | 0.61 | 0.597 | 55.8 | 27.00% |
| 8:09:50 | 1813 | 11.82 ms | 24.3 | 18% | 0.61 | 0.591 | 54.8 | 27.20% |
| 8:10:50 | 1794 | 11.63 ms | 24.6 | 17% | 0.60 | 0.586 | 53.6 | 26.60% |
| 8:11:50 | 1810 | 12.02 ms | 25.1 | 18% | 0.59 | 0.598 | 52.1 | 27.50% |
| 8:12:50 | 1819 | 11.95 ms | 25.2 | 18% | 0.58 | 0.594 | 51.0 | 27.20% |
| 8:13:50 | 1790 | 11.87 ms | 25.7 | 18% | 0.57 | 0.601 | 50.3 | 27.30% |
| 8:14:50 | 1807 | 12.18 ms | 26.0 | 18% | 0.57 | 0.606 | 49.0 | 27.90% |
| 8:15:50 | 1797 | 12.18 ms | 26.3 | 18% | 0.56 | 0.608 | 48.3 | 28.10% |
| 8:15:50 | 1797 | 12.18 ms | 26.3 | 18% | 0.56 | 0.608 | 48.3 | 28.10% |
| 8:16:50 | 1801 | 12.26 ms | 26.7 | 18% | 0.55 | 0.611 | 47.2 | 28.10% |
| 8:17:50 | 1806 | 12.85 ms | 27.7 | 19% | 0.53 | 0.619 | 46.1 | 28.60% |
| 8:18:50 | 1791 | 12.10 ms | 27.4 | 18% | 0.54 | 0.612 | 45.0 | 28.20% |
| 8:19:50 | 1809 | 12.48 ms | 27.8 | 19% | 0.53 | 0.626 | 44.0 | 29.20% |

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A method of starting and operating an internal combustion engine to generate zero carbon emissions, comprising the steps of:
    (a) providing a flow of ammonia fuel from an ammonia supply tank;
    (b) heating the ammonia fuel above its ignition temperature at the start yap of the engine;
    (c) providing a flow of hydrogen fuel from a separate hydrogen supply tank; and
    (d) simultaneously supplying the ammonia fuel and the hydrogen fuel to the internal combustion engine; and
    (e) ceasing heating of the ammonia fuel when the engine temperature exceed the ignition temperature of the ammonia fuel.

2. The method of claim 1, wherein the proportion of hydrogen to ammonia is rich in catalyst hydrogen at starting of the engine.

3. The method of claim 1, wherein electronic fuel injection is used for both fuels.

4. The method of claim 1, wherein direct fuel injection is used for both fuels.

5. The method of claim 1, wherein electronic fuel injection is used for only one of the fuels.

6. The method of claim 1, wherein direct fuel injection is used for only one of the fuels.

7. The method of claim 1, wherein the ratio of hydrogen is between 5% and 100% and the ratio of ammonia is between 0% and 95%.

* * * * *